March 12, 1957 R. J. MARKS 2,784,837
SPECTACLE CASE
Filed Nov. 15, 1954
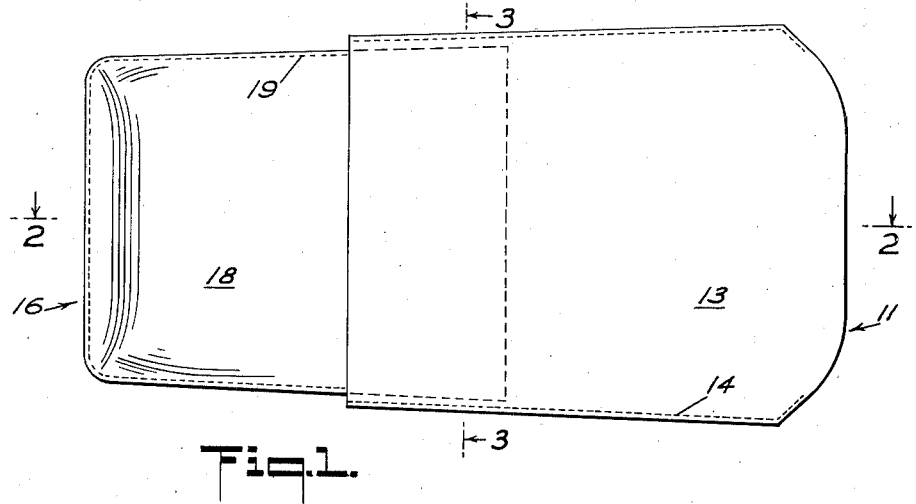
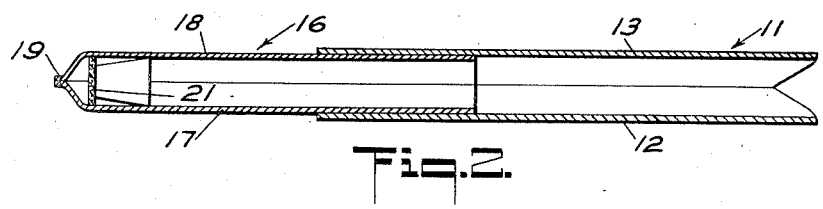
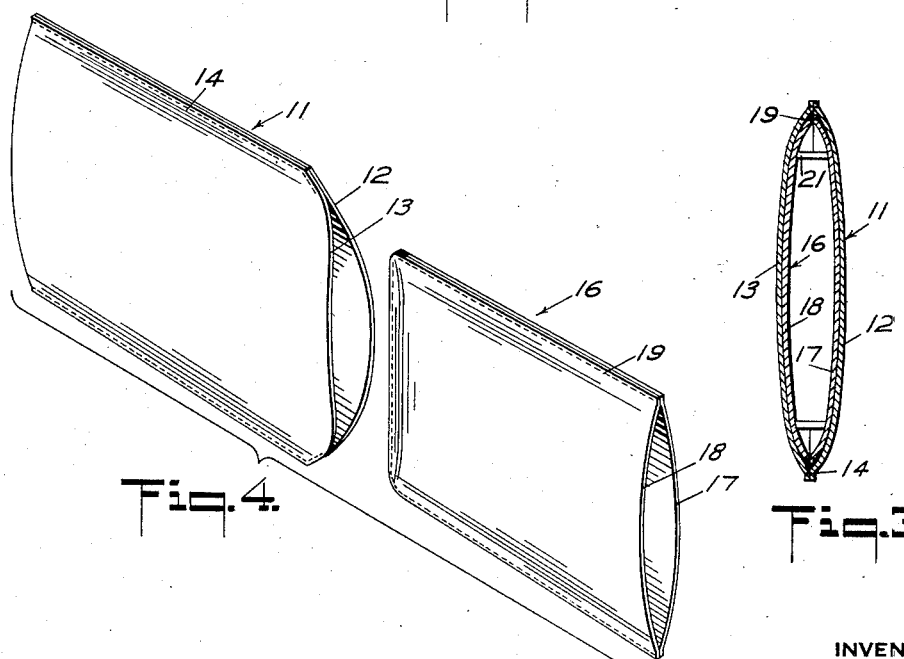
INVENTOR
ROBERT J. MARKS
BY
Gardner & Zimmerman
ATTORNEYS ated Mar. 12, 1957

2,784,837
SPECTACLE CASE
Robert J. Marks, Castro Valley, Calif.

Application November 15, 1954, Serial No. 468,803

2 Claims. (Cl. 206—5)

The present invention relates to an improved spectacle case adapted for slidable extension to accommodate spectacles of varying size and further adapted for slidable compaction to a reduced size when not containing spectacles.

The spectacle case of the present invention has an original minimum size much less than the dimensions of spectacles to be contained therein and protected thereby and contrives by the slidable engagement of parts thereof to expand to required size for any spectacles. There will be seen to be provided by this arrangement a highly advantageous case which requires very little space for storage thereof when same is not in use so as to be readily carried about as in the pocket of one wearing spectacles and thus to be at all times conveniently disposed for use without inconveniencing the bearer thereof with its bulk.

It is an object of the present invention to provide a spectacle case having relatively movable parts disposable in compact relation and expandible therefrom to receive spectacles.

Another object of the present invention is to provide a spectacle case that is extensible to contain spectacles and collapsible therefrom to a compact position for storage.

It is a further object of the present invention to provide a spectacle case having a pair of semi-rigid members slidable between extended position to receive spectacles and a retracted position of maximum compactness for case storage.

Yet another object of the present invention is to provide a spectacle case having a pair of hollow slidably engaging members with tapered cooperating configurations for adjustment of case size and retention of adjusted size.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein:

Figure 1 is a plan view of the spectacle case in extended position.

Figure 2 is a sectional view taken at 2—2 of Figure 1.

Figure 3 is a sectional view taken at 3—3 of Figure 1.

Figure 4 is a partially exploded perspective view of the spectacle case.

Considering now the details of the illustrated embodiment of the invention and referring to the drawing, there will be seen to be provided a first or outer member 11 including a pair of coextensive relatively flat pieces 12 and 13 having tapered sides and curved large ends, as best seen in Figure 1. The two pieces 12 and 13 are joined together along their longitudinal edges so as to form a hollow cylinder, as seen in Figure 4 for example. The member 11 is formed of a semi-rigid material that is sufficiently flexible to be deformed for the insertion of spectacles therein and leather or the like is admirably suited for this purpose. The joinder of parts 12 and 13 is accomplished by sewing the edges thereof together with the stitching 14 extending a short ways along the curved end of the pieces 12 and 13 inwardly from the sewn sides to limit the opening at the large end of the member 11 to a size less than the opening at the small end.

A second or inner member 16 is provided for cooperative engagement with the first member 11 and this inner member 16 may include two substantially flat pieces 17 and 18 formed of the same material as the first member 11. The pieces 17 and 18 are mirror images of each other and may in fact be identical as they each are symmetrical about a central axis. The piece 17, for example, has a plan configuration of a truncated cone with the large end thereof having a greater dimension than the small end of the above mentioned outer member 11. The pieces 17 and 18 of the inner member 16 are sewn together with the stitching 19 thereof extending along the two tapered sides and across the small end so that the member 16 has the largest end thereof open and defines a flat cup or the like.

There may be provided an additional part comprising a spacer 21 in the form of a strip of rigid material having the ends thereof extending substantially parallel at somewhat more than right angles to the plane of the spacer center portion. This spacer 21 is disposed within the inner member 16 at the closed end thereof and serves the function of spacing apart the flat side pieces 17 and 18 thereof so that spectacles may be inserted therein without binding unduly against the inner surfaces of the member 16. The spacer is inserted with the ends thereof pointing out of the inner member 16 so that they press against the sewn edges of the member 16 and these ends of the spacer are tapered so that they prevent the spacer from falling out of the inner member or from becoming turned or otherwise misaligned therein. Of course other means may be employed to secure the spacer within the inner member and permanent and rigid connection of the spacer may be made if desired.

The two members 11 and 16 are adapted for slidable engagement with the inner member 16 disposed within the outer member 11. This relative disposition of the two members is accomplished by deforming the inner member 16 so as to reduce the transverse dimension thereof at the large open end and by then slipping this large end of inner member 16 into the small open end of the outer member 11. As stated above, the large end of the outer member 11 is sewn partially closed at the sides thereof so that the opening is reduced in size with the resultant opening being smaller than the large end of the inner member. Consequently the inner member 16 is retained within the outer member 11 by virtue of the fact that the openings at each end of the outer member are smaller than the large open end of the inner member. The closed end of the inner member is, however, smaller than the small end of the outer member so that the inner member is free to be slid almost entirely out of the small end of the outer member. The two members will be seen to form a pair of hollow truncated cones with the outer member 11 as the outer cone having both ends open and the inner member 16 within the outer member and having one closed and one open end. It will be appreciated that the two mmebers are thus limitedly slidable with respect to each other with the second or inner member 16 being extensible from the small end of the first or outer member 11 and being retained from inadvertent disconnection therefrom by the reduced size of each open end of the first or outer member 11.

Although the two members of the spectacle case are movable relative to each other they do not slide too readily for it is necessary for them to remain in whatever disposition they may be placed. This is accomplished in the illustrated embodiment of the invention by forming the cooperating members 11 and 16 of a material that is only semi-rigid and by making the inner member 16 of almost the same width as the inner dimensions of the outer member 11 so that friction between the members requires the application of a force to slide them relative to each other. Also with leather or the like used in the construction of the members the engaging surfaces of the two members have a substantial coefficient of friction so as to further this effect.

What is claimed is:

1. A spectacle case comprising an outer member having a pair of like flat pieces of semi-rigid material with longitudinal edges tapering together from a large end to a smaller end and sewn together in face contacting relation along said tapering edges to form a collapsed substantially flat open-ended cylinder, an inner member having a pair of flat pieces of semi-rigid material with elongated edges tapering from an end that is smaller than the small end of said outer member to a large end that is intermediate in size between the ends of said outer member, said inner member having the pieces thereof sewn together in face contacting relation along the tapered edges and small end thereof to form a collapsed substantially flat cup and said inner member being slidably disposed within said outer member with the large open end of said inner member closer to the large end of said outer member than is the closed end of said inner member whereby said members are slidable between a retracted position with said inner member wholly within said outer member and an extended position with the inner member extending from said outer member to receive spectacles entirely within the members.

2. A spectacle case as defined in claim 1 further characterized by said outer member having the large end thereof partially closed to a dimension less than that of the large open end of said inner member whereby the latter member is retained within said outer member, and a substantially rigid spacer plate disposed within said inner member across the closed end thereof for spacing the sides thereof to facilitate disposition of spectacles therein.

References Cited in the file of this patent
UNITED STATES PATENTS

| | | |
|---|---|---|
| 289,946 | White | Dec. 11, 1883 |
| 785,938 | Epstein | Mar. 28, 1905 |
| 1,647,210 | Bryans | Nov. 1, 1927 |
| 2,317,302 | Roth | Apr. 20, 1943 |